3,381,011
PYRIDINE PRODUCTION
Reginald Harold Hall, Carshalton, England, assignor to
The Distillers Company Limited, Edinburgh, Scotland,
a British company
No Drawing. Filed Jan. 11, 1966, Ser. No. 519,974
Claims priority, application Great Britain, Jan. 28, 1965,
3,732/65
29 Claims. (Cl. 260—290)

ABSTRACT OF THE DISCLOSURE

A process is provided for the production of pyridine by the catalytic reaction at an elevated temperature of formaldehyde, acetaldehyde, ammonia and oxygen.

Specification

The present invention relates to the production of pyridine, and in particular to the production of pyridine by reacting ammonia with formaldehyde and acetaldehyde.

The production of pyridine and its homologues, particularly $\beta$-picoline, by reacting formaldehyde, acetaldehyde and ammonia in the vapour phase over a catalyst has been described before, for example in our British specification No. 790,994.

Depending upon the exact reaction conditions used, this process yielded with the pyridine substantial quantities of $\beta$-picoline, with or without signficant amounts of $\alpha$- and $\gamma$-picolines.

In certain applications, it is advantageous only to produce pyridine, without the concomitant production of substantial quantities of picolines.

It has now been discovered that if oxygen is included in the reaction mixture comprising formaldehyde, acetaldehyde and ammonia, only small amounts of the picolines are produced, and furthermore the yield of pyridine is enhanced such that it is similar to the total yield of pyridine plus picolines obtained in the prior art process.

Moreover, by including oxygen in the reaction mixture, catalyst inactivation is diminished and the tendency of carbonaceous or resinous materials to deposit on the catalyst or reactor is diminished.

Accordingly, the present invention comprises a process for the catalytic production at elevated temperature of pyridine from a gaseous reaction mixture comprising formaldehyde, acetaldehyde and ammonia characterised in that oxygen is included in the reaction mixture.

The process is preferably carried out by preheating the feeds of formaldehyde and acetaldehyde separately or in admixture, maintaining this mixture at the elevated reaction temperature, and adding the oxygen and ammonia, preferably preheated, immediately before contact with the catalyst bed. Steam may be included in the reaction mixture; it is preferred to add the steam to the formaldehyde and acetaldehyde feed, and especially to preheat the formaldehyde and acetaldehyde in the presence of steam.

The reaction may be carried out over a wide range of temperature, for example 300–550° C., but it is preferred to operate in the range 350° C. to 500° C.

The reaction may be carried out at sub-atmospheric or super-atmospheric pressure. The use of substantially atmospheric pressure is preferred.

The contact time of the process may vary within wide limits, but it is not normally necessary to exceed 50 seconds measured at N.T.P. and based on the stationary volume of the catalyst bed. A range from 0.5 second to 50 seconds is preferred.

The molar ratio of acetaldehyde to formaldehyde may vary widely, for example between 5:1 and 1:2, but is preferably between 3:1 and 1:1.5. The molar ratio of total organic reactants to ammonia may also vary widely, for example from 3:1 to 1:5, but a molar ratio within the range 3:1 to 1:3 is particularly preferred. The molar ratio of total organic reactants to oxygen may also vary widely, for example 10.1 to 1:10 but is preferably within the range from 6:1 to 1:5. Where steam is used, the molar ratio of total organic reactants to steam may vary within very wide limits, for example from 1:1 to 1:20.

Part or all of the acetaldehyde and part or all of the formaldehyde may be replaced by an equivalent amount of a compound giving rise to acetaldehyde or formaldehyde under the conditions of reaction. For example, paraldehyde, which gives rise to acetaldehyde, and methylal, paraformaldehyde methanol and trioxane which give rise to formaldehyde may be used in the process. The molar ratios given above are applicable in such cases, but must of course be calculated then on the basis of acetaldehyde or formaldehyde equivalents.

The oxygen may be added as pure oxygen, or in admixture with other gases which do not interfere with the reaction. Oxygen may most suitably be added as air. Inert diluents, such as nitrogen, may be included in the reaction mixture.

Catalysts suitable for use of the present invention include those catalysts which may be regarded as dehydration and/or cracking catalysts. The catalysts may in addition possess an oxidative function. Amongst suitable catalysts, for example, may be mentioned catalysts comprising alumina, silica-alumina, silica-magnesia or silica-alumina-magnesia. Metal oxides and/or metal or ammonium salts in the presence of dehydration or cracking catalysts, particularly in the presence of alumina or silica-alumina, may also be found effective if stable at the reaction temperature; suitable metal oxides include for example cadmium oxide and lead oxide. Suitable metal salts include, for example, lead fluoride. Alumina or silica-alumina impregnated with hydrofluoric acid or an ammonium salt thereof may also be employed as catalyst.

A preferred catalyst comprises silica-alumina alone or in combination with one or more of the other oxides or salts referred to above.

Where appropriate, the suitable catalyst may be impregnated with a compound or compounds of the other element or elements, which may then be converted, if desired, into the oxide or into a stable salt, for example, by treatment with ammonium fluoride or ammonium hydrogen bifluoride. Catalysts may be prepared, for example, by impregnating alumina or silica-alumina with a nitrate or other soluble salt of one of the desired metals from solution in water, following which the material may be dried and heated at about 400° C. in a slow stream of air. In suitable cases the dried material may be treated with aqueous ammonium fluoride or ammonium hydrogen bifluoride, washed free from soluble salts, re-dried, and heated at temperatures of 400–500° C. for several hours. Catalysts may also be prepared by treating alumina or silica-alumina with hydrogenfluoride, ammonium hydrogen bifluoride or ammonium fluoride alone.

The catalyst may be pretreated to deactivate it partially, for example, by heating to an elevated temperature e.g. to 550–800° C., by treatment with steam at an elevated temperature suitably in the range 550–850° C., or by treatment with an inorganic or organic base, such as ammonia, pyridine, alkyl derivatives of pyridine, sodium carbonate.

Whichever catalyst is employed, it is preferably in a finely divided state suitable for the maintenance of a fluidised bed during the passage of the reactants, although the use of a fixed bed of catalyst is within the scope of the invention.

The pyridine produced by the process of the invention may be recovered from the reaction product by any suitable method, for example by distillation or by extraction with a suitable solvent. When pyridine is to be distilled from the reaction product it is preferred to add an alkali, such as an alkali metal hydroxide or lime, to the mixture before distillation, to avoid contamination of the distillate with ammonium carbonate; excess ammonia from the reaction product is also recovered during distillation in this manner. A preferred separation process involves extraction with a solvent for pyridine, such as benzene or one of its homologues, followed by recovery of the pyridine from the extract by fractional distillation or other suitable process. Residual pyridine in the raffinate from the extraction may be recovered together with ammonia, by distillation with a base such as lime.

While the reaction may be continued for a considerable period without deactivation of the catalyst, especially in the presence of steam as a diluent, it may still be found desirable to regenerate the catalyst at suitable intervals. Regeneration may be carried out by discontinuing the reactant flow and passing molecular oxygen, suitably in the form of air, over the heated catalyst, with a diluent to reduce oxygen concentration. Steam, nitrogen or other inert gases may be used as the diluent. Alternatively, a proportion of the catalyst may be continuously or intermittently removed from the reaction zone and conveyed to a separate regeneration zone. After regeneration the catalyst is then returned to the reaction zone. The regeneration may be carried out at a temperature within the range suitable for the reaction of the invention, but it is best carried out suitably at a temperature at or above the temperature at which the catalyst is to be used for further reaction.

The invention is further illustrated by the following examples.

EXAMPLE 1

Microspheroidal silica alumina (3A "Synclyst" (registered trademark) MS 13 Grade 68 ex J. Crosfield and Sons Ltd.) was steeped in a 17% aqueous solution of lead acetate trihydrate. The catalyst was dried at 100° C. for 1 hour and then steeped in a 3.5% aqueous solutions of ammonium fluoride. The catalyst was washed free from soluble salts, dried at 100° C. for 16 hours, and then heated at 400° C. for 4 hours.

A gaseous mixture of acetaldehyde (3.8 parts by volume), formaldehyde (1.9 parts by volume), ammonia (9.1 parts by volume), air 37.9 parts by volume), additional nitrogen (9.4 parts by volume) and steam (37.9 parts by volume) was passed through a fluidised bed of the above catalyst heated to 400° C. A total of 0.34 mole of acetaldehyde was fed over a period of 4 hours. The contact time, measured at N.T.P. and based on the settled volume of the catalyst, was 4.9 sec.

The gases from the reaction zone were cooled to give a liquid product containing pyridine bases. The uncondensed gases were scrubbed with water to recover a further quantity of pyridine bases. The total yields of pyridine and picolines were: 0.092 mole of pyridine (54% theory), 0.001 mole of α-picoline, and 0.006 mole of a mixture of β- and γ-picolines.

EXAMPLE 2

A gaseous mixture of acetaldehyde (2 parts by volume), formaldehyde (1 part by volume), ammonia (3 parts by volume), air (5 parts by volume), additional nitrogen (2 parts by volume), and steam (20 parts by volume) was passed through a fluidised bed of silica-alumina ("Synclyst" 3A MS 13 Grade 68) heated to 400° C. The contact time, measured at N.T.P. and based on the settled volume of the catalyst, was 9.8 seconds. A total of 7.08 moles of acetaldehyde was fed over a period of 14 hours. A total of 1.64 moles of pyridine and 0.20 mole of a mixture of β- and γ-picolines was obtained. Over a further 7 hours' period 3.61 moles of acetaldehyde were fed, and 0.65 mole of pyridine and 0.06 mole of a mixture of β- and γ-picolines were obtained. The reactor was flushed with nitrogen and the temperature of the catalyst bed raised to 500° C. A mixture of air and steam (molar ratio 1:1) was then passed through the catalyst bed for 6 hours, after which the temperature was decreased to 400° C. and a mixture of acetaldehyde, formaldehyde, ammonia, air, additional nitrogen, and steam, of the same composition as that described above, was passed through the catalyst bed. A total of 6.99 moles of acetaldehyde was fed over a period of 14 hours. The yields of pyridine and β- and γ-picolines were: 1:52 moles of pyridine, and 0.17 mole of a mixture of β- and γ-picolines.

The catalyst was used for several further reaction periods and was regenerated in a mixture of air and steam between each period. In the 10th reaction period a total of 7.12 moles of acetaldehyde were fed, and 1.41 moles of pyridine and 0.20 mole of a mixture of β- and γ-picolines were obtained.

EXAMPLE 3

A gaseous mixture of acetaldehyde (2 parts by volume), formaldehyde (1 part by volume), ammonia (3 parts by volume), air (5 parts by volume), additional nitrogen (2 parts by volume), and steam (3.3 parts by volume), was passed through a fluidised bed of silica-alumina ("Synclyst" 3A MS 13 Grade 68) heated to 400° C. A total of 8.07 moles of acetaldehyde was fed over a period of 6 hours, and 1.74 moles of pyridine and 0.44 mole of a mixture of β- and γ-picolines were obtained. The catalyst was then regenerated in air and steam for 6 hours, as described in Example 2 except for a catalyst temperature of 550° C. A gaseous mixture of acetaldehyde, formaldehyde, ammonia, air, additional nitrogen, and steam, of the same composition as that described above, was passed through the regenerated catalyst heated to 400° C. A total of 7.87 moles of acetaldehyde was fed over 6 hours. The yields obtained were: 1.67 moles of pyridine, and 0.23 mole of a mixture of β- and γ-picolines. The catalyst was used for a further five reaction periods, being regenerated in air and steam between each period. In the final reaction period 8.04 moles of acetaldehyde were fed and 1.68 moles of pyridine and 0.21 mole of a mixture of β- and γ-picolines obtained.

EXAMPLE 4

A gaseous mixture of acetaldehyde (2 parts by volume), formaldehyde (1 part by volume), ammonia (2 parts by volume), air (5 parts by volume), and steam (15 parts by volume) was passed through a fluidised bed of silica-alumina ("Synclyst" 3A MS 13 Grade 68), heated to 400° C. The contact time, as defined in Example 1, was 6.5 seconds. A total of 3.81 moles of acetaldehyde was fed over a period of 28.3 hours. During this time, about 20% of the catalyst was withdrawn from the reactor every hour and replaced by fresh catalyst for the first 10 hours and thereafter with catalyst which had been regenerated by heating to 500° C. for 2 hr. in an equimolar mixture of air and steam. A total of 0.76 mole of pyridine and 0.20 mole of a mixture of β- and γ-picolines was obtained. The percentage yield in the last hour of running was approximately the same as that in the second hour after the start.

EXAMPLE 5

A catalyst was prepared by impregnating microspheroidal silica-alumina ("Synclyst" 3A MS 13, Grade 68) (300 parts by weight) with a solution of lead acetate trihydrate (6.9 parts by weight) in water (400 parts by weight), drying at 110° C., treating with a solution of ammonium fluoride (1.36 parts by weight) in water (400 parts by weight), then washing with water, re-drying at 110° C., and heating to 400° C. for 1 hour. A gaseous mixture of acetaldehyde (2 parts by volume), formaldehyde (1 part by volume), ammonia (4.5 parts by volume), air (20 parts by volume), and steam (20 parts by volume) was passed through a fluidised bed of this catalyst at 400° C. and a contact time (as defined in Example 1) of 6.4 seconds. A total of 2.60 moles of acetaldehyde was fed over a period of 42.5 hours. During this time, catalyst was gradually withdrawn from the reactor and replaced by fresh or regenerated catalyst in the manner described in Example 4. A total of 0.52 mole of pyridine and 0.06 mole of mixed picolines was obtained. During a further 11.5 hours, a total of 0.69 mole of acetaldehyde was fed, but no further renewal of catalyst was carried out. In this time 0.16 mole of pyridine and 0.015 mole of picolines were formed. During a further period of 7 hours, a total of 0.43 mole of acetaldehyde was fed and 0.076 mole of pyridine and 0.007 mole of picolines were formed.

EXAMPLE 6

Microspheroidal silica-alumina catalyst ("Synclyst" 3A MS 13 Grade 68) was heated for 6 hours to 650° C. in a furnace. A gaseous mixture of acetaldehyde (2 parts by volume), formaldehyde (1 part by volume), ammonia (2 parts by volume) air (10 parts by volume), and steam (10 parts by volume) was passed through a fluidised bed of this catalyst at 400° C. at a contact time (as defined in Example 1) of 7.5 seconds. A total of 0.586 mole of acetaldehyde was fed during 5 hours, and 0.108 mole of pyridine and 0.016 mole of picolines were obtained. The catalyst was regenerated by passing an equimolar mixture of air and steam through it at 500° C. for 2 hours, and the process was continued for a further 5 hours. A total of 0.58 mole of acetaldehyde was fed and 0.090 mole of pyridine and 0.013 mole of picolines were obtained. The catalyst was again regenerated in the same manner and the process continued for another 5 hours. A total of 0.577 mole of acetaldehyde was fed and 0.090 mole of pyridine and 0.012 mole of picolines were obtained.

EXAMPLE 7

Another run was carried out under the same conditions as in Example 6, except that the catalyst was not heat-treated before use. In 6 hours a total of 0.703 mole of acetaldehyde was fed, and 0.122 mole of pyridine and 0.024 mole of picolines were obtained. The catalyst was then regenerated and the process continued for a further 4 hours, during which 0.488 mole of acetaldehyde was fed and 0.69 mole of pyridine and 0.012 mole of picolines were obtained. After again regenerating the catalyst, 0.388 mole of acetaldehyde was fed during 5 hours, and 0.055 mole of pyridine and 0.010 mole of picolines were obtained.

EXAMPLES 8–29 (SEE TABLE 1)

Further experiments were made, essentially by the procedure described in Example 1, using different catalysts and different reaction conditions. The results of these experiments are summarised in Table 1. Full descriptions of the catalysts used are given below in the text.

EXAMPLES 8–29.—DETAILS OF CATALYSTS

Examples 8–9, 11–23 and 27–28

In all these examples the brand of silica-alumina catalyst employed was "Synclyst" 3A MS 13 Grade 68 ex J. Crosfield and Sons Ltd.

Example 8.—The silica-alumina catalyst was heated at 850° for 12 hr. before use.

Example 9.—Steam was passed over the silica-alumina catalyst at 600° for 12 hr. before use.

Example 10.—Silica-alumina catalyst ("Synclyst" 3A MS 25 Grade 68 ex J. Crosfield and Sons Ltd.) was used without further treatment.

Examples 11 and 12.—The silica-alumina catalyst was used without further treatment.

Methanol was included in the feed (methanol: formaldehyde=1:1 molar).

Example 13.—A mixture of 40% hydrofluoric acid (10.5 parts by weight) and water (160 parts by weight) was added to the silica-alumina catalyst (100 parts by weight). The catalyst was dried at 100° C. for 16 hr. and then heated in a stream of air at 400° C. for 4 hr.

Example 14.—A solution of ammonium hydrogen bifluoride (7 parts by weight) in water (170 parts by weight) was added to the silica-alumina (100 parts by weight). The catalyst was dried at 100° C. for 16 hr. and then heated in a stream of air at 400° C. for 4 hr.

Example 15.—A solution of lead acetate trihydrate (6.2 parts by weight) in water (170 parts by weight) was added to the silica-alumina (100 parts by weight. The catalyst was dried at 100° C. for 16 hr., heated for 4 hr. in a stream of air at 400° C., and sieved through a 170 B.S.S. mesh before use.

Examples 16–21.—The silica-alumina catalyst was pretreated in the reactor at the reaction temperature for about 1 hr. immediately before the start of the run with a mixture of ammonia, steam, and nitrogen (3.3:11.2:16.0, by volume). The contact time was 8.4 sec.

Example 22.—The silica-alumina catalyst was pretreated in the reactor at 400° C. for 5 hr. with a mixture of pyridine, ammonia, steam, air, and nitrogen (1.0:1.65:19.9:12.5:6.5, by volume)

The contact time was 7.9 sec.

Example 23.—The silica-alumina catalyst was pretreated in the reactor at 400° C. for 2 hr. with a mixture of β-picoline, steam, and nitrogen (1:45:20, by volume). The contact time was 7.7 sec.

Example 24.—Silica-alumina-magnesia catalyst ("Aerocat 3C–12" ex Cyanamid Corporation) was used without further treatment.

Examples 25 and 26.—Silica-alumina-magnesia catalyst ("Aerocat 3C–20" ex Cyanamid Corporation) was used without further treatment.

Example 27.—A solution of magnesium nitrate hexahydrate (21.09 parts by weight) in water (100 parts by weight) was added to a stirred mixture of the silica-alumina (100 parts by weight) and water (400 parts by weight). The mixture was stirred for a short time and then a solution of sodium carbonate (8.72 parts by weight) in water (50 parts by weight) was added slowly. Stirring was continued for 1 hr. after which the catalyst was filtered off, washed with water, and dried at 110° C.

Example 28.—A warm solution of "Rosin Amine D" (2 parts by weight; ex Hercules Powder Co.) in ethanol (36 parts by weight) was added slowly to the silica-alumina (100 parts by weight) which was agitated by swirling. The product was dried at 110° C. for 17 hrs.

The run was interrupted after 11 hr. (period a), the reactor was flushed with nitrogen, and a mixture of air and steam (approx. 1:1, by volume was passed through the catalyst bed for 5 hr. at 500° C. The temperature of the bed was then reduced to 450° C. and a mixture of acetaldehyde, formaldehyde, steam, ammonia, air, and additional nitrogen of the same composition as that used initially was passed through the bed for a period of 6.5 hr. period b). The catalyst was then regenerated at 500° C. exactly as before and used for a further reaction period of 14 hr. (period c).

EXAMPLE 29

Silica-magnesia catalyst (W. R. Grace & Co., SM-30) was used without further treatment.

EXAMPLES 30-49 (SEE TABLE 2)

In these examples the catalysts were used in the form of granules (6-16 mesh B.S.S.) in fixed beds. Details of the experiments are summarised in Table 2 and descriptions of the catalysts employed are given in the text below.

In Examples 38 and 49 the gaseous feed to the reactor contained a small amount of sulphur dioxide (see Table 2).

EXAMPLES 30-49.—DETAILS OF CATALYSTS

In the preparation of all these catalysts, granular silica-alumina (6-16 mesh B.S.S.; "Synclyst" 3A MS 13/MD) which had been dried at 110–120° C. for several hours was employed.

EXAMPLES 30, 31 and 32

Dried silica-alumina (50 parts by weight) was placed in a flask which was evacuated for 1½ hr. at 15 mm. Hg pressure. While the flask was still under vacuum an aqueous solution (100 parts by weight) of lead acetate trihydrate (11.5 parts by weight) was added slowly, the contents of the flask being swirled throughout the addition. The catalyst granules were collected and dried at 120° C. for 1 hr.

The granules were again placed in a flask and the latter was evacuated for 1½ hr. as before. While it was still under vacuum an aqueous solution (100 parts by weight) of ammonium fluoride (7.2 parts by weight) was added slowly, the contents of the flask being swirled throughout the addition. The catalyst granules were collected, washed with water, dried at 120° C. for 1 hr., and finally heated at 400° C. for 17 hr. in a flow current of air.

In Example 32 paraldehyde was fed in place of acetaldehyde.

EXAMPLE 33

A solution of ammonium hydrogen bifluoride (2.86 parts by weight) in water (60 parts by weight) was added slowly to dried silica-alumina (100 parts by weight) which was agitated throughout the addition. The granules were then dried at 120° C. for 2 hr. and finally heated at 500° C. for 17 hr. in a slow stream of air.

EXAMPLES 34-38

The procedure used for the catalyst of Example 33 was employed, except that 7.0 parts by weight of ammonium hydrogen bifluoride in 50 parts by weight of water were used for every 100 parts by weight of dried silica-alumina.

EXAMPLES 39-41

An aqueous solution (50 parts by weight) of hydrofluoride acid (2 parts by weight) was added slowly to dried silica-alumina (100 parts by weight) which was agitated throughout the addition. The catalyst granules were then dried at 120° C. for 17 hr. and finally heated at 500° C. for 17 hr. in a slow current of air.

EXAMPLES 42 and 43

A solution of ammonium fluoride (0.678 part by weight) in water (25 parts by weight) was added to a solution of potassium carbonate (1.194 parts by weight) in water (25 parts by weight) and the mixture was added slowly to dried silica-alumina (100 parts by weight) which was agitated throughout the addition. The catalyst granules were then dried at 110° C. for several hours and finally heated at 500° C. for 17 hours in a slow current of air.

In Example 43 methanol was included in the feed (methanol:formaldehyde=1:1 molar).

EXAMPLE 44

A solution of potassium chloride (1 part by weight) in water (30 parts by weight) was added slowly to dried silica-alumina (100 parts by weight) which was agitated throughout the addition. The catalyst granules were dried at 110° C. for several hours and finally heated at 500° C. for 17 hr. in a slow stream of air.

EXAMPLE 45

A solution of potassium iodide (1 part by weight) in water (30 parts by weight) was added slowly to dried silica-alumina (100 parts by weight) which was agitated throughout the addition. The catalyst granules were dried at 110° C. for several hours and finally heated at 500° C. for 17 hr. in a slow stream of air.

EXAMPLE 46

A solution of phosphoric acid (1.05 parts by weight s.g. 1.75) in water (50 parts by weight) was added slowly to dried silica-alumina (100 parts by weight) which was agitated throughout the addition. The catalyst granules were dried at 120° C. for 17 hr. and finally heated at 500° C. for 17 hr. in a slow current of air.

EXAMPLES 47 and 48

A solution of nickel nitrate hexahydrate (4.96 parts by weight) in water (60 parts by weight) was added slowly to dried silica-alumina (100 parts by weight) which was agitated throughout the addition. The catalyst granules were dried at 120° C. for several hours and finally heated at 500° C. for 16 hr. in a slow stream of air.

EXAMPLE 49

In Example 49 the dried silica-alumina was used in the run without further treatment.

3,381,011

TABLE 1

| Example No. | Nature of catalyst (see text) | Reaction temp. (°C.) | Contact time (sec.) | Feed composition (parts by volume) | | | | | | Duration of run (hr.) | Acet-aldehyde fed (moles) | Pyridine obtained (moles) | β- and γ-picoline obtained (moles) |
| --- | --- | --- | --- | --- | --- | --- | --- | --- | --- | --- | --- | --- | --- |
| | | | | Acetaldehyde | Formaldehyde | Steam | Ammonia | Air | Additional nitrogen | | | | |
| 8 | Heat treated SiO₂-Al₂O₃ | 400 | 6.4 | 2 | 1 | 20 | 3 | 5 | 4 | 12 | 1.16 | 0.28 | 0.027 |
| 9 | Steam treated SiO₂-Al₂O₃ | 400 | 6.4 | 2 | 1 | 20 | 3 | 5 | 4 | 12 | 1.19 | 0.27 | 0.026 |
| 10 | SiO₂-Al₂O₃ | 400 | 6.4 | 2 | 1 | 20 | 3 | 5 | 4 | 6 | 0.58 | 0.12 | 0.020 |
| 11 | SiO₂-Al₂O₃ | 380 | 9.0 | 2 | 1 | 10 | 3 | 5.2 | 3.2 | 14 | 4.34 | 1.01 | (¹) |
| 12 | HF/SiO₂/Al₂O₃ | 400 | 7.3 | 2 | ²1.05 | 7.7 | 5 | 5.2 | | 12 | 1.74 | 0.39 | 0.003 |
| 13 | NH₄HF₂/SiO₂/Al₂O₃ | 400 | 7.8 | 2 | 1 | 20 | 3 | 5 | 4 | 12 | 1.23 | 0.34 | 0.040 |
| 14 | PbO/SiO₂/Al₂O₃ | 400 | 7.0 | 2 | 1 | 20 | 2.1 | 10 | 7 | 17.5 | 1.10 | 0.31 | 0.021 |
| 15 | SiO₂-Al₂O₃ | 380 | 9.0 | 2 | 1 | 10 | 3 | 5 | | 20 | 5.42 | 1.18 | (¹) |
| 16 | SiO₂-Al₂O₃ | 400 | 7.0 | 2 | 1 | 3.35 | 5 | | | 12 | 2.58 | 0.57 | 0.083 |
| 17 | SiO₂-Al₂O₃ | 450 | 6.3 | 2 | 1 | 20 | 2.5 | 5.05 | 2.25 | 18 | 1.95 | 0.43 | 0.053 |
| 18 | SiO₂-Al₂O₃ | 450 | 18.7 | 2 | 1 | 20 | 2.9 | 5.05 | 4.45 | 17 | 2.09 | 0.25 | 0.030 |
| 19 | SiO₂-Al₂O₃ | 400 | 6.3 | 2 | 1 | 20 | 2.85 | | 4.4 | 6.5 | 1.72 | 0.42 | 0.050 |
| 20 | SiO₂-Al₂O₃ | 400 | 6.8 | 2 | 0.5 | 18 | 2.9 | | 4.4 | 13 | 0.51 | 0.091 | 0.001 |
| 21 | SiO₂-Al₂O₃ | 450 | 6.3 | 2 | 1.5 | 20 | 2.85 | 5.05 | 4.4 | 18.5 | 1.80 | 0.49 | 0.053 |
| 22 | SiO₂-Al₂O₃-MgO | 400 | 6.3 | 2 | 1 | 20.5 | 2.9 | 5.05 | 4.45 | 19.5 | 1.94 | 0.30(5) | 0.067 |
| 23 | SiO₂-Al₂O₃ | 450 | 6.3 | 2 | 1 | 20.5 | 2.9 | 5.05 | 4.4 | 13 | 1.29 | 0.47(5) | 0.033 |
| 24 | SiO₂-Al₂O₃ | 450 | 6.3 | 2 | 1 | 20 | 2.9 | 5.05 | 4.4 | 11 | 1.28 | 0.29 | 0.031 |
| 25 | SiO₂-Al₂O₃-MgO | 400 | 6.3 | 2 | 1 | 18 | 2.9 | 5.05 | 4.4 | 12 | 1.21 | 0.24 | 0.040 |
| 26 | SiO₂-Al₂O₃-MgO | 400 | 6.3 | 2 | 1 | 20 | 2.9 | 5.05 | 4.45 | 14 | 1.42 | 0.35 | 0.045 |
| 27 | SiO₂-Al₂O₃-MgCO₃ | 400 | 6.3 | 2 | 1 | 20.5 | 2.9 | 5.05 | 4.45 | (a) 11 (b) 6.5 (c) 14 | 1.07 0.65 1.39 | 0.25 0.15(5) 0.34 | 0.026 0.015 0.034 |
| 28 | SiO₂-Al₂O₃ treated with "Rosin Amine D" | 450 | 6.3 | 2 | 1 | 20.5 | 2.9 | 5.05 | 4.46 | 5 | 0.575 | 0.059 | 0.009 |
| 29 | SiO₂-MgO | 400 | 7.5 | 2 | 1 | 10 | 2 | 10 | 0 | | | | |

¹ Not determined.  ² Plus MeOH, 1.05.

TABLE 2

| Example No. | Nature of catalyst (see text) | Reaction temp. (°C.) | Contact time (sec.) | Feed composition (parts by volume) | | | | | | Duration of run (hr.) | Acetaldehyde fed (mmoles) | Pyridine obtained (mmoles) | α-Picoline obtained (mmoles) | β-/γ-picoline obtained (mmoles) |
| --- | --- | --- | --- | --- | --- | --- | --- | --- | --- | --- | --- | --- | --- | --- |
| | | | | Acetaldehyde | Formaldehyde | Steam | Ammonia | Air | Nitrogen | | | | | |
| 30 | PbF₂/SiO₂-Al₂O₃ | 350 | 3.0 | 2 | 1 | 20.3 | 5.55 | 22.3 | 2.35 | 5 | 202 | 40.6 | 2.8 | 3.4 |
| 31 | PbF₂/SiO₂-Al₂O₃ | 350 | 8.4 | 2 | 1 | 20.2 | 5.1 | 20.3 | 4.1 | 5 | 109 | 23.0 | 0.8 | 1.5 |
| 32 | PbF₂/SiO₂-Al₂O₃ | 400 | 2.4 | ¹2 | 0.95 | 7.5 | 9.45 | 9.45 | 2.55 | 5 | 420 | 71.9 | 4.2 | 4.2 |
| 33 | NH₄HF₂/SiO₂-Al₂O₃ | 350 | 8.2 | 2 | 1 | 20.4 | 4.9 | 19.6 | 3.9 | 5 | 113 | 24.4 | 0.9 | 1.2 |
| 34 | NH₄HF₂/SiO₂-Al₂O₃ | 350 | 6.9 | 2 | 1 | 20.0 | 5.1 | 10.2 | 4.1 | 5 | 109 | 21.2 | <0.5 | 3.1 |
| 35 | NH₄HF₂/SiO₂-Al₂O₃ | 350 | 7.9 | 2 | 1 | 20.2 | 5.2 | 8.9 | 4.15 | 5 | 109 | 20.7 | 1.1 | 3.4 |
| 36 | NH₄HF₂/SiO₂-Al₂O₃ | 350 | 8.7 | 2 | 1 | 20.5 | 1.95 | 3.65 | 3.9 | 5 | 108 | 33.5 | 1.2 | 4.9 |
| 37 | NH₄HF₂/SiO₂-Al₂O₃ | 350 | 5.7 | 2 | 1 | 20.5 | 5.3 | 5.15 | 3.7 | 5 | 166 | 31.2 | 2.3 | 4.9 |
| 38 | NH₄HF₂/SiO₂-Al₂O₃ | 350 | 5.6 | 2 | 1 | ²20.2 | 5.3 | 21.3 | 2.7 | 5 | 172 | 20.6 | <0.5 | 7.8 |
| 39 | HF/SiO₂-Al₂O₃ | 350 | 8.6 | 2 | 1 | 20.7 | 4.95 | 19.8 | 2.0 | 5 | 106 | 22.3 | 0.5 | 5.0 |
| 40 | HF/SiO₂-Al₂O₃ | 350 | 8.5 | 2 | 2 | 20.5 | 5.3 | 21.3 | 4.25 | 5 | 113 | 20.0 | 3.1 | 1.3 |
| 41 | HF/SiO₂-Al₂O₃ | 350 | 8.5 | 2 | 1 | 18.4 | 5.3 | 19.8 | 4.25 | 5 | 105 | 20.0 | 3.6 | 5.0 |
| 42 | KF/SiO₂-Al₂O₃ | 350 | 8.4 | 2 | 2 | 20.5 | 5.2 | 21.3 | 4.25 | 5 | 106 | 19.2 | 0.9 | 1.2 |
| 43 | KF/SiO₂-Al₂O₃ | 350 | 8.6 | 2 | 1 | ³18.8 | 5.2 | 20.6 | 4.1 | 5 | 105 | 20.0 | 0.8 | 1.5 |
| 44 | KCl/SiO₂-Al₂O₃ | 350 | 8.4 | 2 | 1 | 20.4 | 5.2 | 20.0 | 4.0 | 5 | 108 | 20.8 | 1.3 | 2.3 |
| 45 | KI/SiO₂-Al₂O₃ | 360 | 6.5 | 2 | 1 | 18.3 | 5.0 | 19.6 | 4.9 | 5 | 107 | 23.1 | 1.3 | 1.2 |
| 46 | H₃PO₄/SiO₂-Al₂O₃ | 350 | 8.5 | 2 | 1 | 20.4 | 5.3 | 21.1 | 4.0 | 5 | 111 | 20.7 | 1.7 | 1.6 |
| 47 | NiO/SiO₂-Al₂O₃ | 300 | 8.2 | 2 | 2 | 20.4 | 4.9 | 19.6 | 3.9 | 5 | 113 | 21.7 | 1.2 | 3.0 |
| 48 | NiO/SiO₂-Al₂O₃ | 350 | 8.6 | 2 | 1 | 18.4 | 5.3 | 21.1 | 4.2 | 5 | 106 | 20.9 | 1.7 | 1.3 |
| 49 | SiO₂-Al₂O₃ | 350 | 5.7 | 2 | 1 | ⁴20.1 | 3.0 | 5.1 | 2.65 | 5 | 168 | 29.9 | 2.9 | 6.1 |

¹ Paraldehyde.  ² Plus 0.01 SO₂.  ³ Plus 1.0 MeOH.  ⁴ Plus 0.04 SO₂.

I claim:
1. In the process for the catalytic production of pyridine comprising reacting a gaseous reaction mixture comprising formaldehyde, acetaldehyde and ammonia over a catalyst at a temperature of from about 300 to 550° C., the improvement according to which oxygen is included in the reaction mixture in an amount such that the molar ratio of total organic reactants to oxygen is in the range of about 10:1 to 1:10.

2. The process according to claim 1 wherein the catalyst is a dehydration and/or cracking catalyst.

3. The process according to claim 1 wherein the catalyst comprises alumina, silica-alumina, silica-magnesia or silica-alumina-magnesia.

4. The process according to claim 1 wherein the catalyst possesses an oxidation function and a dehydration and/or cracking function.

5. The process according to claim 1 wherein the catalyst is a dehydration and/or cracking catalyst which further comprises at least one metal oxide and/or at least one metal salt stable at the reaction temperature.

6. The process according to claim 1 wherein the catalyst is a metal oxide and/or metal salt or ammonium salt stable at reaction temperature admixed with alumina, silica-alumina, silica magnesia or silica-alumina-magnesia.

7. The process according to claim 1 wherein the catalyst comprises cadmium oxide, lead oxides and/or lead fluoride admixed with alumina, silica-alumina, silica-magnesia or silica-alumina-magnesia.

8. The process according to claim 1 wherein the caylst is treated with ammonium fluoride or ammonium hydrogen trifluoride.

9. The process according to claim 1 wherein the catalyst is alumina or silica-alumina treated with hydrofluoric acid or an ammonium salt thereof.

10. The process according to claim 1 wherein the catalyst is pretreated to partially deactivate it.

11. The process according to claim 1 wherein the catalyst is pretreated to partially deactivate it by heating to a temperature in the range 550°–800° C.

12. The process according to claim 1 wherein the catalyst is pretreated to partially deactivate it by treatment with steam at a temperature in the range 550°–850° C.

13. The process according to claim 1 wherein the catalyst is partially deactivated by pretreatment with an inorganic or organic base.

14. The process according to claim 1 wherein the catalyst is partially deactivated by treatment with ammonia, pyridine, an alkyl derivative of pyridine, sodium carbonate or magnesium carbonate.

15. The process according to claim 1 wherein the catalyst is in a fluidised condition.

16. The process according to claim 1 wherein the feeds of formaldehyde and acetaldehyde are maintained at the elevated reaction temperature and oxygen and ammonia are added immediately before contact with the catalyst bed.

17. The process according to claim 1 wherein steam is present in the reaction mixture.

18. The process according to claim 1 wherein steam is present in the reaction mixture and the feeds of acetaldehyde and formaldehyde are preheated with steam.

19. The process according to claim 1 wherein the contact time measured at N.T.P. on the stationary volume of the catalyst, is in the range 0.5 sec. to 50 sec.

20. The process according to claim 1 wherein the molar ratio of acetaldehyde to formaldehyde is in the range 5:1 to 1:2.

21. The process according to claim 1 wherein the molar ratio of total organic reactants to ammonia is in the range 3:1 to 1:5.

22. The process according to claim 1 wherein steam is present in the reaction mixture and the molar ratio of total organic reactants to steam is in the range 1:1 to 1:20.

23. The process according to claim 1 wherein part or all of the acetaldehyde is replaced by an equivalent amount of a compound giving rise to the acetaldehyde under the conditions of reaction.

24. The process according to claim 1 wherein acetaldehyde is replaced by paraldehyde.

25. The process according to claim 1 wherein part or all of the formaldehyde is replaced by an equivalent amount of a compound giving rise to formaldehyde under the conditions of the reaction.

26. The process according to claim 1 wherein formaldehyde is replaced by methylal, paraformaldehyde, methanol or trioxane.

27. The process according to claim 1 wherein oxygen is added in admixture with other gases which do not interfere with the course of the reaction.

28. A process for the catalytic production of pyridine by reaction of a gaseous mixture comprising formaldehyde, acetaldehyde, ammonia and oxygen wherein the reaction takes place at atmospheric pressure at a temperature in the range 350–500° C. in the presence of a catalyst comprising alumina or silica-alumina treated with a compound selected from cadmium oxide, lead oxides, lead fluoride, ammonium fluoride, ammonium hydrogen bifluoride or hydrofluoric acid, the molar ratio of acetaldehyde to formaldehyde is in the range 3:1 to 1:1.5, the molar ratio of total organic reactants to ammonia is in the range 3:1 to 1:3, the molar ratio of total organic reactants to oxygen is in the range 6:1 to 1:5 and the oxygen is added as air.

29. The process according to claim 28 wherein steam is included in the reaction mixture and the ratio of total organic reactants to steam is in the range 1:1 to 1:20.

References Cited

FOREIGN PATENTS 742,643  12/1955  Great Britain.
887,688  6/1962  Great Britain.

JOHN D. RANDOLPH, *Primary Examiner.*

WALTER A. MODANCE, *Examiner.*

AL ROTMAN, *Assistant Examiner.*